(12) United States Patent
Garg et al.

(10) Patent No.: US 8,495,230 B2
(45) Date of Patent: Jul. 23, 2013

(54) METHOD FOR SCHEDULING SERVICE PERIODS IN A WIRELESS LOCAL AREA NETWORK (WLAN)

(75) Inventors: Atul Garg, San Jose, CA (US); Javier Del Prado Pavon, Ossining, NY (US); Sai Shankar, Tarrytown, NY (US); Amjad Soomro, Hopewell Junction, NY (US); Zhun Zhong, Croton-on-Hudson, NY (US)

(73) Assignee: Koninklijke Philips N.V., Eindhoven (NL)

( * ) Notice: Subject to any disclaimer, the term of this patent is extended or adjusted under 35 U.S.C. 154(b) by 2197 days.

(21) Appl. No.: 10/548,707

(22) PCT Filed: Mar. 5, 2004

(86) PCT No.: PCT/IB2004/000663
§ 371 (c)(1),
(2), (4) Date: Sep. 8, 2005

(87) PCT Pub. No.: WO2004/082211
PCT Pub. Date: Sep. 23, 2004

(65) Prior Publication Data
US 2006/0171362 A1 Aug. 3, 2006

Related U.S. Application Data

(60) Provisional application No. 60/453,755, filed on Mar. 11, 2003, provisional application No. 60/482,276, filed on Jun. 25, 2003.

(51) Int. Cl.
*G06F 15/16* (2006.01)

(52) U.S. Cl.
USPC .................. 709/230; 370/348; 370/350

(58) Field of Classification Search
USPC ............ 709/250, 230; 370/338, 324, 395.62, 370/345, 350, 348
See application file for complete search history.

(56) References Cited

U.S. PATENT DOCUMENTS

| | | | |
|---|---|---|---|
| 6,917,598 B1 * | 7/2005 | Emeott et al. | 370/311 |
| 6,990,616 B1 * | 1/2006 | Botton-Dascal et al. | 714/715 |
| 7,221,681 B2 * | 5/2007 | Choi et al. | 370/447 |
| 7,221,686 B1 * | 5/2007 | Belcea | 370/509 |
| 2002/0122409 A1 * | 9/2002 | Kandala | 370/348 |
| 2003/0012165 A1 * | 1/2003 | Soomro et al. | 370/338 |
| 2003/0026286 A1 | 2/2003 | Nakamura | |

(Continued)

FOREIGN PATENT DOCUMENTS

JP 2001-053711 2/2001

OTHER PUBLICATIONS

S.Choi, IEEE P802.11 Wireless LANs, May 16, 2001, Phillips Research, pp. 11-13.*

(Continued)

*Primary Examiner* — John MacIlwinen
(74) *Attorney, Agent, or Firm* — Larry Liberchuk

(57) ABSTRACT

A wireless local area network (WLAN) includes at least one hybrid coordinator (HC) and at least one Quality of Service Station (QSTA). The HC transmits a schedule frame element (SEF). The WLAN also includes a clocking mechanism that sets a substantially absolute start time of a service interval. A method of synchronizing the HC and the QSTA includes transmitting a schedule element frame (SEF), and setting a substantially absolute start-time of a service interval, and a first transmitted frame element.

17 Claims, 3 Drawing Sheets

U.S. PATENT DOCUMENTS

| | | | | |
|---|---|---|---|---|
| 2004/0002357 | A1* | 1/2004 | Benveniste | 455/550.1 |
| 2004/0008661 | A1* | 1/2004 | Myles et al. | 370/350 |
| 2004/0131019 | A1* | 7/2004 | Kandala | 370/311 |
| 2004/0196850 | A1* | 10/2004 | Ho | 370/395.4 |
| 2005/0068928 | A1* | 3/2005 | Smith et al. | 370/338 |
| 2006/0153148 | A1* | 7/2006 | Bichot et al. | 370/338 |

OTHER PUBLICATIONS

Jose-maria Catena, Wednesday Sep. 30, 1998, p. 3, http://www.prorec.com/Articles/tabid/109/EntryID/67/Default.aspx.*

Heindl et al. The Impact of Backoff, EIFS, and Beacon on the Performance of IEEE 802.11 Wireless Lans. Proceedings of IPDS 2000, pp. 103-112. 2000.*

S. Mangold et al., "IEEE 802.11E—Fair Resource Sharing Between Overlapping Basic Service Sets," IEEE, PIMRC 2002.*

"Emerging IEEE 802.11e WLAn for Quality of Service (QOS) Provisioning".

IEEE 802.11 Wireless LAN.

IEEE 802.11E—Fair Resource Sharing Between Overlapping Basic Service sets, Stefan Mangold et al.

"IEEE 802.11e Wireless LAN for Quality of Service", Stefan Mangold.

"Medium Access Control Enhancements for Quality of Service", IEEE std 802.11e/D4.0 Nov. 2002.

"Multiple Frame Exchanges during EDCF TXOP" by Sunghyun Choi et al.

Draft amendment to Standard, Part II Wireless Medium Access Control and Physical Layer specifications. Medium Access Control Quality of Service Enhancements.

* cited by examiner

METHOD FOR SCHEDULING SERVICE PERIODS IN A WIRELESS LOCAL AREA NETWORK (WLAN)

CROSS REFERENCE TO RELATED APPLICATION

This application claims the benefit of U.S. provisional application Ser. No. 60/453,755 filed Mar. 11, 2003 and U.S. provisional application Ser. No. 60/482,276 filed Jun. 25, 2003 both of which are incorporated herein by reference.

The use of wireless connectivity in data and voice communications continues to increase. These devices include portable computers, personal device assistants, cellular phones, computers in a wireless local area network (WLAN), portable handsets, and the like. The wireless communication bandwidth has significantly increased with advances of channel modulation techniques, making the WLAN a viable alternative to wired and optical fiber solutions.

IEEE 802.11 is a standard that covers the specification for the Medium Access Control (MAC) sub-layer and the Physical (PHY) layer of the WLAN. While this standard has provided for significant improvement in the control of voice and data traffic, the continued increase in the demand for network access and at increased channel rates has required a continuous evaluation of the standard and change thereto. For example, much effort has been placed on support for real-time services in WLAN's, particularly with Quality of Service (QoS) guarantees.

While the provision of the IEEE 802.11E specification for the polling sequence outlined above does advance the efficiency of the WLAN, there are, nonetheless, shortcomings. For example, the minimum service period and the maximum service period are referenced from the start of the first successful data or QoS coordinated function QoS(+)CF-Poll transmission by the QAP (also referred to the Hybrid Coordinator (HC)). Although a data frame or Poll transmitted by the HC may be received correctly by the QSTA, the required acknowledgement of the receipt may not be received properly by the HC. As such, the QSTA sets the minimum service period at the prescribed time and to the prescribed parameters set therein after receiving this schedule element frame from the HC, while the HC having not received the acknowledgement, may during the maximum service period, retransmit the previous signal based on the assumption that the previous transmission was not received. However, because the QSTA has set the start of the minimum period already, it may be, for example, in power save mode, so it will not receive the poll, and a protocol failure has occurred. These and other problems in coordination of traffic transmission and reception can occur as a result of the ambiguity in the time to start a service interval. Ultimately, these result in wasted network resources and deleterious effects on performance.

In addition to the ambiguity that can arise in the set-point of the start of the minimum service period, the end of the service duration can also be ambiguous and result in a protocol failure. For example, the QSTA may send its last frame, which is not received by the HC; or the HC may send a last frame, which is received, and acknowledged by the QSTA, but the acknowledgement is not received by the HC. In either case, after the QSTA performs its last task in the particular period, it may enter power save mode or some other function in which is not receiving transmissions. Meanwhile, the HC may continue to transmit to the QSTA, and thereby waste valuable resources. Additionally, the HC may have finished servicing the QSTA before the end of the service period. As such, the QSTA will remain in an on-state unnecessarily, while it could have entered a power save mode, or before entering the power save mode, manage its internal queues. Of course, this results in a waste of valuable wireless network resources.

Furthermore, because in known techniques, the transmission opportunity (TXOP) is linked to the service period. To this end, the service period is set to equal to the period required to deliver one TXOP. As such, after each service period, the QTSA enters a power save mode. Because switching from power save mode to an 'on' state requires a comparatively large amount of power, one needs to solve this ambiguity to reduce power waste.

Accordingly, what is needed is a method of polling and transmitting traffic (data and/or voice frames) between the HC and the QSTA's of a WLAN that overcomes at least the deficiencies of known techniques such as those described above.

In accordance with an exemplary embodiment, a method of transmitting and receiving traffic in a wire local area network (WLAN) system includes setting a substantially absolute start time for a first service interval; and sending the traffic to and from the first device to the second device in an interval of time after the start time.

In accordance with an exemplary embodiment, a wireless local area network (WLAN) includes at least one hybrid coordinator (HC) and at least one Quality of Service Station (QSTA). The HC transmits a schedule frame element (SEF). The WLAN also includes a clocking mechanism that sets a substantially absolute start time of a service interval.

The invention is best understood from the following detailed description when read with the accompanying drawing figures. It is emphasized that the various features are not necessarily drawn to scale. In fact, the dimensions may be arbitrarily increased or decreased for clarity of discussion.

In the following detailed description, for purposes of explanation and not limitation, exemplary embodiments disclosing specific details are set forth in order to provide a thorough understanding of the present invention. However, it will be apparent to one having ordinary skill in the art having had the benefit of the present disclosure, that the present invention may be practiced in other embodiments that depart from the specific details disclosed herein. Moreover, descriptions of well-known devices, methods and materials may be omitted so as to not obscure the description of the present invention.

Figure 1:
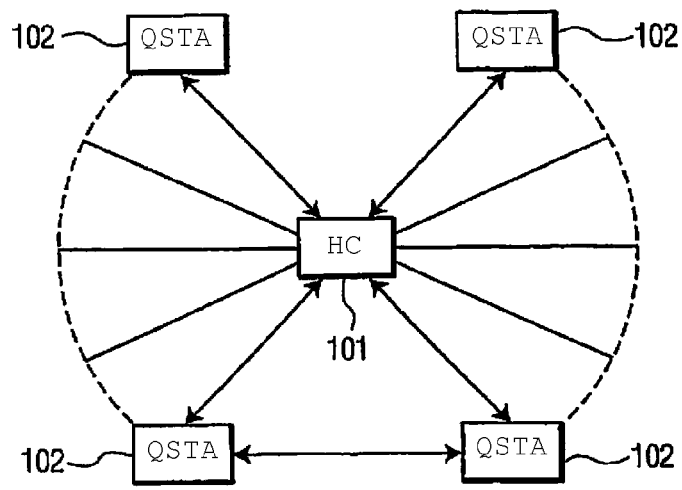
FIG. 1 is a block diagram of a wireless local area network in accordance with an exemplary embodiment.

FIG. 1 shows a WLAN 100 in accordance with an exemplary embodiment. The WLAN 100 includes at least one HC 101, which is connected by wireless infrastructure (not shown) to a plurality of QSTA's 102. It is noted that in the exemplary embodiment four QSTA's 102 are shown. This is done to promote clarity in the discussion of the exemplary embodiments. The QSTA's 102 are illustratively portable devices such as personal computers, appliances, handsets, and other devices usefully connected in a WLAN. In accordance with an exemplary embodiment, the WLAN 100 and its elements substantially comply with the IEEE 802.11 standard, and its revisions and versions. The WLAN 100 also includes the modifications and improvements of the exemplary embodiments of the present application. It is noted that many elements and methods of the WLAN 100 are in compliance with the specification IEEE 802.11E Draft D4.0. It is noted that the entire disclosure of the referenced specification is specifically incorporated herein by reference.

In operation the HC 101 dictates the communications between the various QSTA's 102. To this end, the HC coordinates the transmission of voice and data by the QSTA's 102. In accordance with an exemplary embodiment the QSTA's 102 are connected to one another only through the HC 101. In accordance with another exemplary embodiment, the QSTA's may be in communication with one or more QSTA's without having to transmit first to the HC 101. The former is known as an uplink, while the latter is referred to as a direct link. While these aspects of the WLAN 100 are germane to a general understanding of the exemplary embodiments, their details are not generally required for an understanding of the exemplary embodiments. As such, these details are not included so as to not obscure the description of the exemplary embodiments.

Figure 2A:
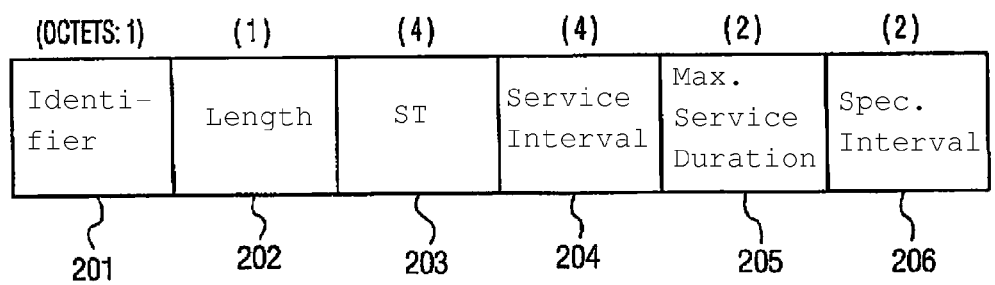
FIGS. 2a and 2b are illustrative schedule element frames in accordance with exemplary embodiments.

FIG. 2a shows an SEF 200 in accordance with an exemplary embodiment. The SEF 200 includes an element identifier frame element 201, a length frame element 202, a service interval frame element 204, a maximum service duration frame element 205 and a specification interval frame element 206. These elements are known in the art, and the details of these frame elements are specified in the standard IEEE 802.11E Draft D4.0, the disclosures of which are specifically incorporated herein by reference. It is noted that some of these frame elements are discussed more fully in connection with exemplary embodiments.

The SEF 200 also includes a start time frame element (ST) 203. The ST 203 includes information from the HC of the absolute start time of the most imminent service interval. As will become clearer as the present description continues, the setting of the start time in an absolute manner provides synchronicity between the HC and the particular QSTA (or multiple QSTA's) that will be serviced in an uplink or downlink, or direct link manner by the HC in the service interval. Accordingly, because the QSTA has the absolute time of the start of the service interval, the problems associated with the ambiguity of the start time of the service interval of known techniques and apparati is substantially eliminated by the methods and apparati of the exemplary embodiments. It is noted that the absolute start time of the ST 203 may be set by synchronizing the clock of the QSTA to that of the HC via the Timing Synchronization Function (TSF) of the HC, and may be set as an absolute time by the TSF; or may be set relative to an absolute offset relative to a particular target beacon transmission time (TBTT). The details of the various techniques for setting the start time in keeping with the exemplary embodiments are described more fully below.

Figure 2B:
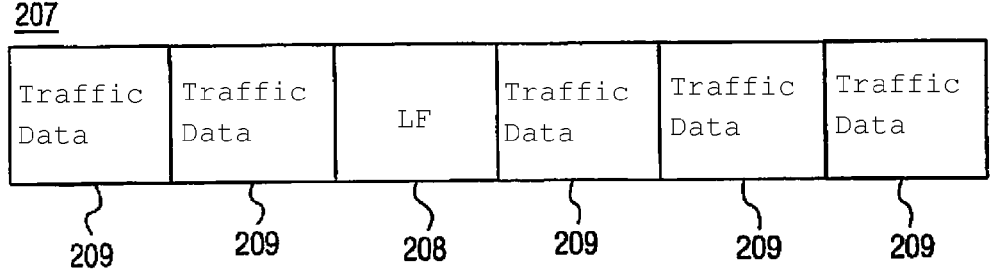

In accordance with another exemplary embodiment shown in FIG. 2b, when the HC completes servicing the QSTA in a particular service interval, the last frame exchange is sent via an SEF 207 similar to the SEF 200, and includes a last frame identifier (LF) 208 in a QoS control field of the frame. The SEF 207 also includes frames 209, which include various traffic data according to the referenced IEEE standard. The last frame identifier 208, when received by the QSTA informs the QSTA that for the particular service interval, all traffic in uplink or downlink form is completed. Ultimately, this allows the QSTA to save power-save mode, and thereby save power by not remaining in an on-state unnecessarily; and allows the QSTA may manage its internal queues, particularly its time-sensitive queues, affording a significant advantage compared to the known techniques and apparati referenced previously. To wit, without receiving the termination notice via the last frame identifier of an exemplary embodiment, the QSTA would remain in an on-state until the end of the maximum service duration as set forth in the frame element 205. Finally, it is noted that the HC will continue to transmit the last frame identifier until an acknowledgement of receipt (ACK) by the QSTA is received. This eliminates ambiguity in the termination point of the service period, and overcomes the drawbacks attendant thereto that plague the networks using known techniques and apparati.

Figure 3:
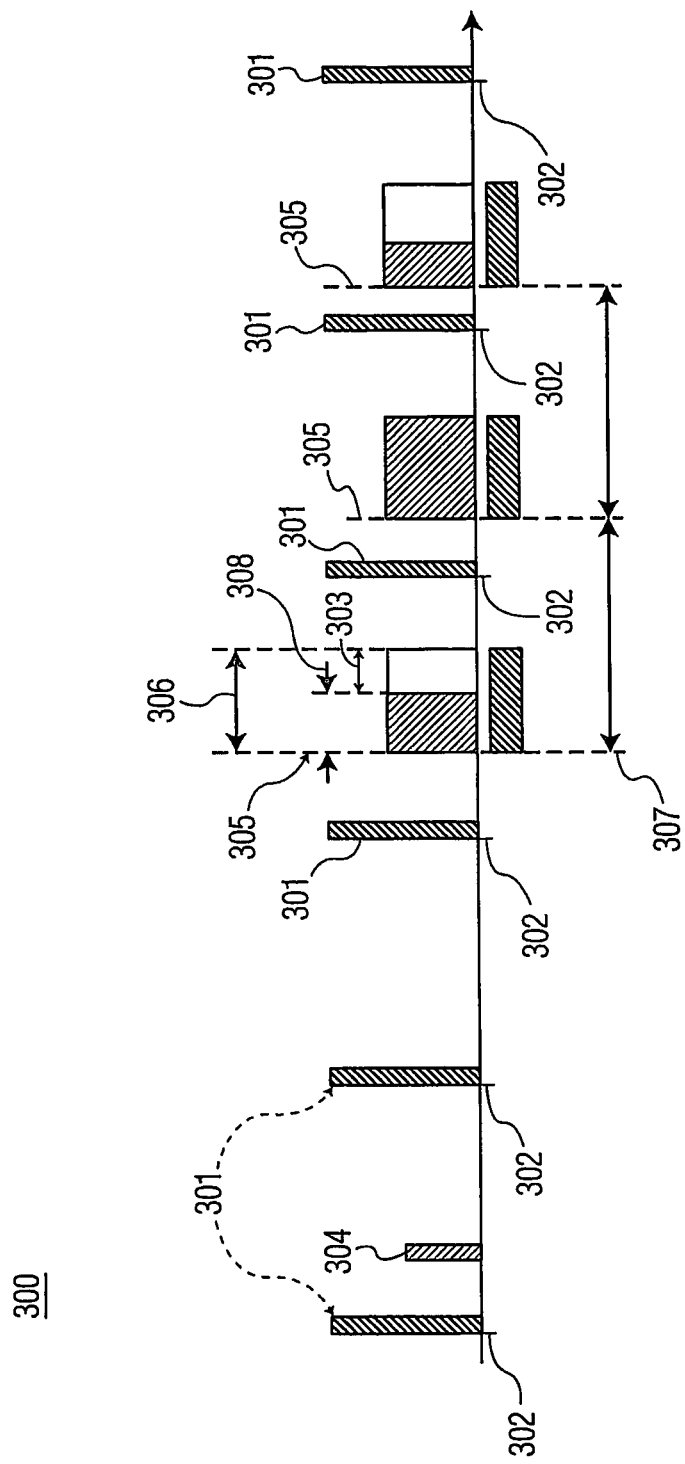
FIG. 3 is an illustrative time line showing a transmission sequence in accordance with an exemplary embodiment.

FIG. 3 shows a timeline of a portion of as transmission sequence 300 in accordance with an exemplary embodiment. The present sequence is a time division multiple access (TDMA) based sequence. As is well known, the HC of a network may be adapted to transmit beacons 301, which are to be at TBTT's 302 as shown. The beacons include useful information such as the TSF of the HC. It is noted that the beacon transmission may be not received or interfered with, but the TBTT's are set. To this end, the TBTT information is included in the TSF of the HC, and once the QSTA has received the TSF, it can effect two tasks, which are useful in meting out exemplary embodiments. First, the QSTA (or multiple QSTA's of the WLAN) can set its clock signal to be synchronous with the clock of the HC. Additionally, the QSTA (or multiple QSTA's of the WLAN) can record the target transmission beacon times. These tasks are useful in embodiments described more fully herein.

The HC sends the SEF 304 to one or more QSTA's, which includes an ST such as ST 203 of the exemplary SEF of FIG. 2a. Thereby, the start time is set in the TSF referenced above, and is illustratively set to the low order four bytes of the TSF timer at the start of the first service interval, expressed in units of microseconds. In the exemplary embodiment, the SEF 304 includes a start time 305, which, as mentioned above, is an absolute time reckoned by the intended one or more QSTA's, because the clock of the QSTA has been synchronized with that of the HC. Accordingly, the QSTA is set to enter an on-state at the start time 305. Moreover, the SEF includes information on a maximum service duration 306, and because the SEF sets the start time 305 at regular intervals, all service intervals for the particular SEF 304 are readily set. To this end, unless and until another SEF is sent or the QSTA terminates the service interval, the start time and the service interval commence and terminate at the regular intervals set by the SEF per the TSF.

In the time between the SEF 304 and the start time 305 the QSTA may enter a power save mode, or may manage internal queues, or both. In any event, because there is no ambiguity in the start time, the QSTA is not wasting time and power awaiting for the start of the service interval. Moreover, the synchronicity of the start time substantially prevents the waste of network resources that can occur using known methods and apparati due to the ambiguity in the start time.

At the start time 305, a service period 308 begins. Illustratively, the service period is a contiguous time during which a set of one or more downlink frames or one or more transmission opportunities (TXOP's) are granted by the HC to the QSTA. Usefully, the first service period begins when the low order 4 bytes of the TSF equals the value specified in the start field of the SEF (i.e., the start time 305). During this period 308, which can last as long as the maximum service duration, the HC services the QSTA via uplink, or downlink, or direct link traffic. When the HC send the last SEF of the service period, an LF, such as LF 208 is sent indicating the termination of the service period. In the present exemplary embodiment, the service period ends with a time 303 left in the maximum service duration 306. Again, the termination of the service period 308 may occur at any time after the start time 305 and up to the maximum service duration 306. Alternatively, the QSTA can terminate the service interval, which terminates further service intervals, as referenced above.

Advantageously, because ambiguity in the termination of the service period is substantially eliminated by the transmission of the LF, or because the maximum service duration 306 terminates at an absolute time, the QSTA does not remain in an on-state unnecessarily, and is free to manage internal queues, or enter a power save mode, or both. This is a significant improvement compared to known methods and apparati, which are plagued by the ambiguity in the time of termination of a particular service period.

In addition to the improvements referenced, the methods and apparatus of the exemplary embodiments can include more than one TXOP in a particular service period. This is a significant improvement compared to known apparati and methods that set the service period equal to the time required for one TXOP. As such, by known techniques each time a TXOP is complete, the QSTA may enter a power save mode. In order to send another TXOP, the QSTA will have to re-power from the power save mode to the on-state, which takes a significant amount of energy compared to the energy needed to remain in an on-state. Accordingly, to complete multiple TXOP's, it may take multiple separate power-up procedures via the known methods and apparati. In stark contrast, according to exemplary embodiments, multiple TXOP's may be carried out after a single power up, thereby foregoing multiple power-consuming power-ups. Ultimately, this improves power saving and promotes efficient WLAN resource use. Finally, it is noted that the maximum service duration is set to accommodate a desired number of TXOP's and is set in the SEF 304.

Figure 4:
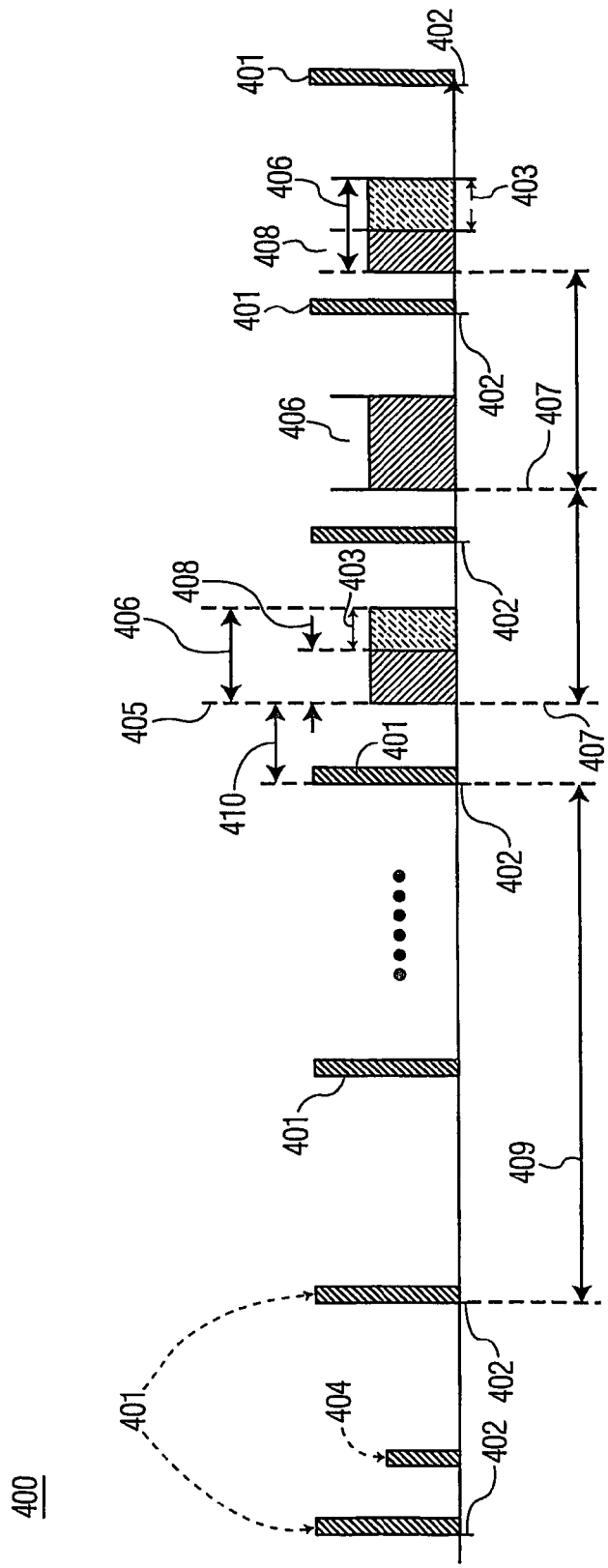
FIG. 4 is an illustrative time line showing a transmission sequence in accordance with an exemplary embodiment.

FIG. 4 shows a time line of a portion of as transmission sequence 400 in accordance with an exemplary embodiment. The transmission sequence 400 shares certain common features and functions with the embodiment of FIG. 3. As such, while referenced, unless distinguished, common elements are understood to have a common function. The sequence includes the transmission of beacons 401, which may include the TSF of the HC. TBTT's 402 are useful in setting the start time 405 of a service interval 407, and of all subsequent service intervals 407. An SEF 404 is transmitted by the HC and may be as described in connection with FIG. 4a. The SEF 404 includes information on the start time in a start time element such as the start time element 203. To this end, the SEF 404 sets the start time 405 to begin at a certain time after a certain number of TBTT's 402 after the SEF 404. The SEF 404 is thereby sent and acknowledged, and after a prescribed integer number of TBTT's 409 and a prescribed beacon offset period 410, the first service interval begins at the start time 405. The SEF 404 includes the service interval period and frequency, and the maximum service duration 406. As described in connection with the exemplary embodiment of FIG. 3, the service period may be as long as the maximum service duration 406. However, if the HC sends an SEF with a LF, such as LF 208, a service period 408 terminates at a time earlier than the expiration of the maximum service duration. The difference in the time between the end of the service period 408, and the end of the maximum service duration is shown at 403.

The setting of an absolute start time 405 using the TBTT beacon count 409 and offset time 410 as described above provides an absolute start time, with the benefits as described above in connection with the exemplary embodiments of FIG. 3. Moreover, the advantages of terminating the service period 408 via an LF provides the advantages referenced in connection with the embodiments of FIG. 3 as well. Finally, the maximum service duration can be set to accommodate a plurality of TXOP's, which benefits the WLAN from the perspective of power savings and efficient resource use. These benefits are described in connection with the embodiments of FIG. 3 above.

The exemplary embodiment being thus described, it would be obvious that the same may be varied in many ways by one of ordinary skill in the art having had the benefit of the present disclosure. Such variations are not regarded as a departure from the spirit and scope of the invention, and such modifications as would be obvious to one skilled in the art are intended to be included within the scope of the following claims and their legal equivalents.

The invention claimed is:

1. A method of sending traffic to and from a first device of a wireless local area network (WLAN) to a second device of the WLAN, the method comprising:
    setting a substantially absolute start time for a first service interval; and
    sending the traffic to and from the first device to the second device in an interval of time after the start time;
    wherein a plurality of transmission opportunities (TXOP's) are sent in a single service period, and
    wherein the single service period lies within the first service interval.

2. A method as recited in claim 1, wherein the setting further includes synchronizing a clock of the second device to a clock of the first device, and sending the start time to the second device.

3. A method as recited in claim 2, wherein the setting further comprises sending a schedule frame element (SEF), which includes the start time.

4. A method as recited in claim 2, wherein the synchronizing further comprises sending a timing synchronization function (TSF) from the first device, which includes information of the clock of the first device.

5. A method as recited in claim 4, wherein the first device is a hybrid coordinator (HC) and the second device is a quality of service station (QSTA).

6. A method as recited in claim 5, wherein the TSF is transmitted via a beacon.

7. A method as recited in claim 1, wherein the service period occurs at the beginning of the service interval, and ends concurrently with or before a termination of a maximum service period.

8. A method as recited in claim 1, wherein the service period is terminated by the first device, which sends a last frame element (LF) in an SEF.

9. A method as recited in claim 1, wherein a plurality of service intervals occur after a termination of the first service interval, and the plurality of service intervals are consecutive, with each service interval having a temporal period equal a temporal period of the first service interval, and a frequency that is an inverse of the temporal period.

10. A method as recited in claim 1, wherein the setting of the substantially absolute start time further comprises:
    transmitting a beacon, which includes a plurality of target beacon transmission times (TBTT's); and starting the first service interval after the passing of an integer number of TBTT's plus an offset period.

11. A method as recited in claim 10, wherein the setting further comprises sending a schedule frame element (SEF), which includes the integer number of TBTT's and the offset period.

12. A method as recited in claim 11, wherein the first device is a hybrid coordinator (HC) and the second device is a quality of service station (QSTA).

13. A method as recited in claim 10, wherein the service period occurs at the beginning of the service interval, and ends concurrently with or before a termination of a maximum service period.

14. A method as recited in claim 10, wherein the service period is terminated by the first device, which sends a last frame element (LF) in an SEF.

15. A wireless local area network (WLAN), comprising: at least one Quality of Service Station (QSTA) that is coupled to a hybrid coordinator (HC), wherein a start time of a first service interval is set at an substantially absolute time; and wherein a plurality of transmission opportunities (TXOP's) are sent in a single service period, and wherein the single service period lies within the first service interval.

16. A WLAN as recited in claim 15, wherein the substantially absolute time is set by synchronizing a clock of the QSTA to a clock of the HC, and sending the start time to the QSTA.

17. A WLAN as recited in claim 15, the substantially absolute time is set by transmitting a beacon from the HC, wherein the beacon includes a plurality of target beacon transmission times (TBTT's); and the first service interval starts after the passing of an integer number of TBTT's plus an offset period.

* * * * *